(No Model.)
T. H. HOLMAN.
BALL BEARING FOR AXLES.
No. 563,858. Patented July 14, 1896.
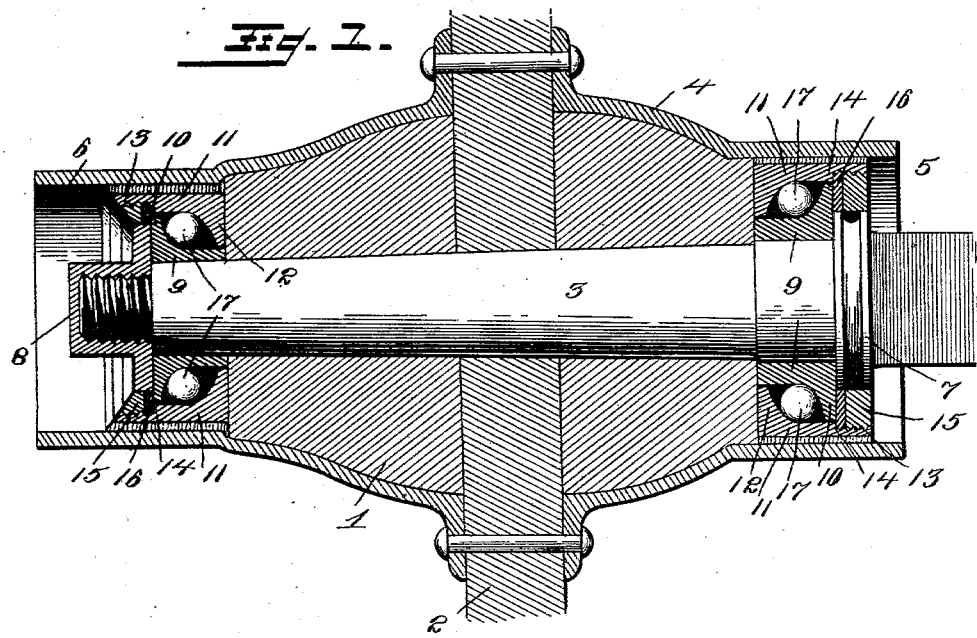
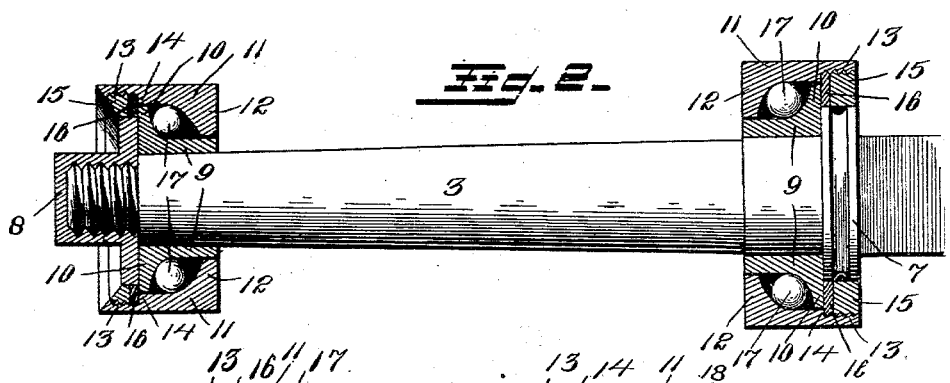
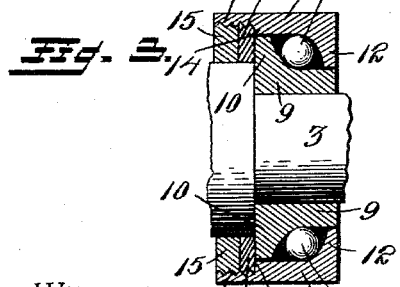
Witnesses
H. J. Koerth
V. B. Hillyard
Inventor
Thomas Henry Holman,
By his Attorneys,
C. A. Snow & Co.

UNITED STATES PATENT OFFICE.

THOMAS HENRY HOLMAN, OF NEWARK, OHIO, ASSIGNOR OF ONE-HALF TO H. K. JOHNSON, OF CHICAGO, ILLINOIS.

BALL-BEARING FOR AXLES.

SPECIFICATION forming part of Letters Patent No. 563,858, dated July 14, 1896.

Application filed February 21, 1896. Serial No. 580,230. (No model.)

*To all whom it may concern:*

Be it known that I, THOMAS HENRY HOLMAN, a citizen of the United States, residing at Newark, in the county of Licking and State of Ohio, have invented new and useful Improvements in Ball-Bearings for Axles, of which the following is a specification.

This invention relates to ball-bearings for vehicle-wheels, and which with slight adaptation and modifications can be applied to line-shafting of machinery and to the journals of crushing and roller mills, and wherever it is desired to reduce the friction between relatively-rotating parts.

The object of the improvement is to reduce the operating parts to a minimum number and to combine them in such a manner that the resultant bearing can be applied wherever required. When used in connection with vehicle-wheels, two bearings will be employed and located at the ends of the hub and within cases formed by means of a shell enveloping the said hub, the end portions of the shell being projected beyond the ends of the hub a proper distance to envelop and inclose the bearings. By thus assembling the parts the hub is not weakened by recessing the ends to receive the bearings, and the inner ends of the spokes secure a better purchase in the body of the hub, because the latter is not bored larger than necessary to receive the axle or spindle upon which it is mounted.

Other objects and advantages than those enumerated are contemplated and will become apparent as the nature of the invention is understood; and to attain the desired end the invention consists, essentially, in certain novel features of construction and combinations of parts, substantially as herein illustrated, described, and specifically claimed.

In the drawings, Figure 1 illustrates the invention applied to a vehicle-wheel, the latter having its outer portion removed and its hub and bearings shown in sections. Fig. 2 is a detail view showing the bearings applied to the opposite ends of the axle or spindle. Fig. 3 is a detail view of a bearing, the latter being in section. Fig. 4 is a modification showing the bearing adapted for rollers.

Referring to the drawings, the same reference-numerals denote corresponding and like parts in all the figures, and in the same 1 indicates the hub, 2 the spokes, and 3 the axle, of an ordinary vehicle-wheel and its mounting. A shell 4 envelops the hub and has its end portions extending beyond the ends of the hub to form cases 5 and 6, which receive and house the bearings arranged at the ends of the hub. The case 5 also forms the sand-band and extends over the shoulder 7 at the inner end of the axle, and the case 6 forms the point-band which incloses the axle-nut 8.

The bearings constructed substantially as hereinafter to be more particularly described are fitted against the ends of the hub and within the respective cases and are confined between the shoulder 7, the axle-nut 8, and the respective adjacent ends of the hub, and are concealed and protected by being located wholly and entirely within the cases. Thus it will be seen that the hub is not weakened by being recessed to receive the bearings, and its bore is not unnecessarily enlarged to receive any skein or other part for connecting the bearings. Hence the spokes obtain a maximum purchase in the hub. Again, this disposition of the parts admits of the bearings being provided of the greatest proportions possible consistent with the size of the wheel. Hence great strength is attained and one or more sets of balls may be employed if so desired.

The bearing consists, essentially, of a cone 9, having a flange 10 at one end, a cup or ball-race 11 encircling the cone and having a flange 12 at the end opposite the flanged end of the cone, and having a portion projecting beyond the flanged end of the cone and internally threaded, as shown at 13, and forming an annular shoulder 14 at the base of the threaded portion 13 and in the plane of the flanged end of the cone 9, a locking-ring 15, fitted into the threaded portion 13 and overlapping the joint formed between the flange 10 and the opposing side of the cup or ball-race 11, and an absorbent washer 16, corresponding in width to the locking-ring 15 and coming between the latter and the annular shoulder 14 and the outer end of the flange 10. The balls 17 are fitted between the cone 9 and the cup or ball-race 11. The locking-ring 15 is externally threaded so as to screw into the threaded portion 13 of the cup or ball-race, thereby securing the parts after they have been properly assembled. The locking-ring will be of such relative size as to fit over the shoulder 7 or the flange of the axle-nut 8, according to which end of the hub the bearing is fitted.

It will be understood that the bearings will be provided in various sizes to adapt them to the various makes and sizes of axles; also that they can be manufactured in any form to meet a particular requirement, whether for machinery or vehicles. Very little lubricant is required for preserving the bearing in working condition, and the excess which will escape at the lowermost point of the cup or ball-race will be taken up by the absorbent washer, thereby preventing the escape of the oil, and in the event of the bearings being applied to vehicle-wheels the lubricant will be prevented from escaping and finding its way to the center portion of the hub.

In the modification shown in Fig. 4 the box or casing of the bearing is constructed precisely in the same manner as shown in the other views, with the exception that the said box or casing is lengthened to adapt it to receive roller-bearings 18 in lieu of the balls 17.

Having thus described the invention, what is claimed as new is—

A ball-bearing constructed substantially as herein shown and described, the same comprising a cone having an outer flange at one end, a cup or bearing-race encircling the cone and having an inner flange at the end opposite the flanged end of the cone and snugly embracing the latter, and having a portion projecting beyond the flanged end of the cone and enlarged and threaded internally, and forming an annular shoulder at the base of the threaded portion and in the plane of the flanged end of the cone, a locking-ring exteriorly threaded and screwed into the threaded portion of the cup or bearing-race and overlapping the joint between the latter and the flanged end of the cone, an absorbent washer corresponding in width to the locking-ring and interposed between the latter and the said annular shoulder and the flanged end of the cone, and rollers interposed between the said cone and the cup or bearing-race, substantially in the manner and for the purpose specified.

In testimony that I claim the foregoing as my own I have hereto affixed my signature in the presence of two witnesses.

THOMAS HENRY HOLMAN.

Witnesses:
HENRY K. JOHNSON,
A. L. JOHNSON.